March 3, 1964  L. G. FOXWELL ETAL  3,123,444
ZERO GRAVITY GAS ANALYZER
Filed Feb. 16, 1961  2 Sheets-Sheet 1

INVENTORS
LEO G. FOXWELL
GERALD F. HUMISTON
BY Norman Friedland
AGENT

March 3, 1964 L. G. FOXWELL ETAL 3,123,444
ZERO GRAVITY GAS ANALYZER

Filed Feb. 16, 1961 2 Sheets-Sheet 2

INVENTORS
LEO G. FOXWELL
GERALD F. HUMISTON
BY Norman Friedland
AGENT

# United States Patent Office 3,123,444
Patented Mar. 3, 1964

3,123,444
ZERO GRAVITY GAS ANALYZER
Leo G. Foxwell, Thompsonville, Conn., and Gerald F. Humiston, Springfield, Mass., assignors to United Aircraft Corporation, East Hartford, Conn., a corporation of Delaware
Filed Feb. 16, 1961, Ser. No. 89,771
11 Claims. (Cl. 23—254)

This invention relates to a system for making gas analysis of a fluid and particularly to means for utilizing an atmosphere as a reference and comparing that same with the same atmosphere having a constituent removed therefrom so as to ascertain the quantity of the removed constituent.

The industry offers a variety of gas analyzing apparatus which for the most part are either temperature sensitive, flow sensitive, pressure sensitive, dust imparted sensitive, bulky, weighty, and costly, or they may be susceptible to inaccuracies due to vibration and in some instances may be slow for indicating the results. It is therefore a purpose of this invention to provide a device for obviating the above disadvantages.

It still is a further object to provide a device of the type as described which utilizes a portion of the gas sample to be analyzed as a reference pressure signal and compare this signal with a signal generated by the residue gas after the absorption has taken place. The use of the reference signal, in this manner, nullifies the detrimental effects of a varying reference pressure as is probable in a space or zero gravity environment. The resultant signal may be utilized for either recording the amount of the constituent removed or for operating a cooperating system, such as an environmental control system disclosed in application No. 39,385, filed June 28, 1960, entitled Air Purifier, by W. E. Arnoldi, assigned to the same assignee. This device which we have invented offers particular application in an atmosphere which is free from gravitational effects, since this device does not rely on the gravitational phenomena for its operation nor would the lack of gravity influence the accuracy of this device.

Other features and advantages will be apparent from the specification and claims, and from the accompanying drawings which illustrate an embodiment of the invention.

Figure 1:
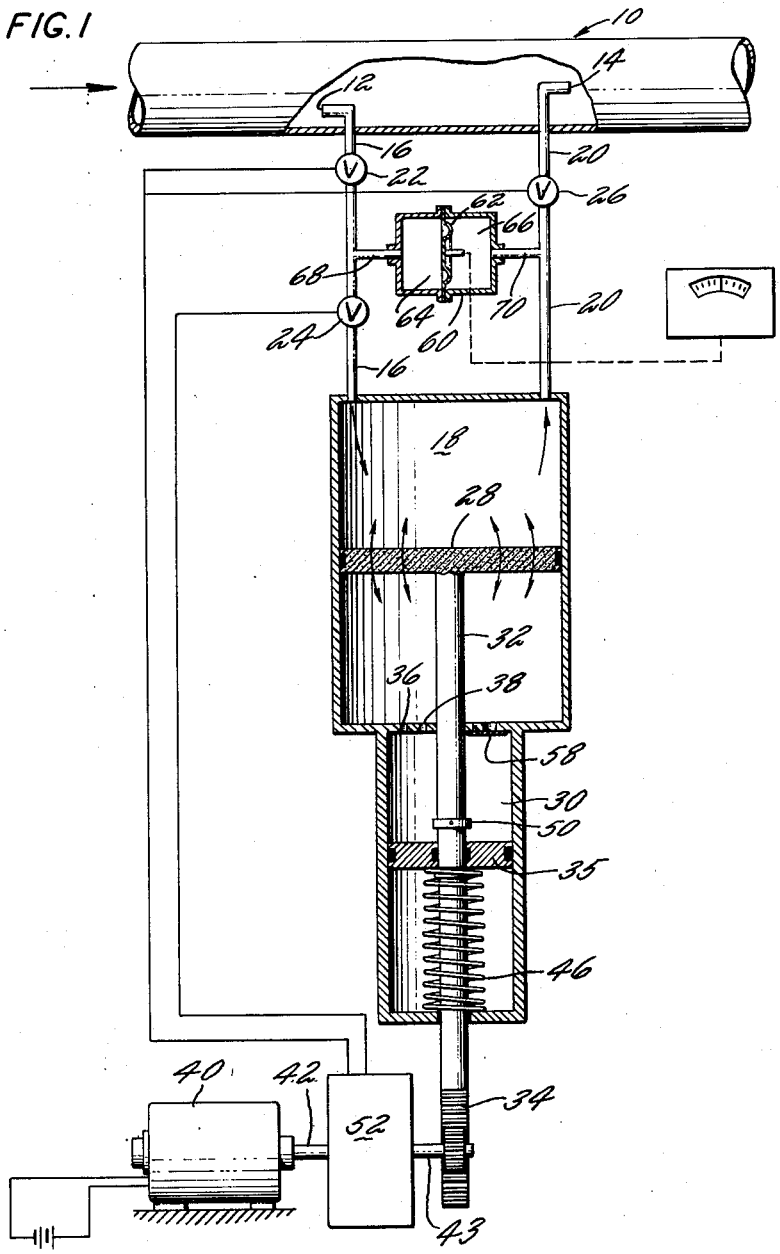
FIG. 1 is a schematic illustration embodying the principles of our invention.

Referring particularly to FIG. 1, numeral 10 shows a conduit carrying a fluid which is intended to be analyzed so as to ascertain the quantity of one of its constituents. An impact pressure probe 12 and a static pressure probe 14 are disposed in the conduit for conducting a sample through pipe 16 and into chamber 18, which impetus results due to the pressure differential evidenced at the inlet and outlet respectively at these pressure probes. That is to say, when flow is evidenced in conduit 10, the pressure probe 12 will be sensitive to the total pressure and the pressure probe 14 will be sensitive to the static pressure and since these pressures are different (due to the velocity effect) difference will exist between the inlet 12 and the outlet 14, causing fluid to be conducted through pipe 16 into chamber 18 and then to egress through pipe 20. Although what has just been described is a preferred method of inducing flow into the gas sampling chamber 18, it will be apparent to those skilled in the art that other flow inducing means may be employed.

Disposed in pipe 16 are a pair of sequentially operated valves 22 and 24 and disposed in pipe 20 is sequentially operated valve 26. These valves may be of any suitable on-off type of valves. The operation and functions of these valves will be described hereinafter. Disposed in chamber 18 is a sintered piston 28 which may be formed of any of the well-known sintered metallic compositions or of a sintered ceramic composition. As will be more fully appreciated hereinafter, this sintered piston which is reciprocable within chamber 18 is designed so that its porosity is sufficient so as to allow the gaseous fluid intended to be analyzed to pass therethrough and yet will prevent the passage of the liquid absorption chemical. Attached to this sampling chamber 18 is a second chamber 30 which serves to contain the liquid absorption chemical. The sintered piston 28 carries an elongated stem 32 which projects axially through chamber 30 and may carry on its free end a rack gear 34. Within chamber 30 and mounted on stem 32 is provided a second piston 35 which serves to displace the fluid within chamber 30 and force it into chamber 18 through orifices 36 and 38 when the piston is moved toward its most upward position. An electrical motor 40 drives shaft 42 which is connected to sequencer 52 and in turn drives shaft 43 which carries pinion gear 44 at its end which engages the teeth of rack gear 34. Any of the well-known sequencing mechanisms may be employed to impart rectilinear motion to shaft 32. A low force spring 46 engages the underside of piston 35 and serves to move piston 35 between stops 48 and 50. This functions to take up any lost space in chamber 30 which may result due to a loss in liquid absorption chemical. Sequencing device 52, driven by shaft 42 of motor 40, serves to sequence the operation of the valving and piston as will be more fully explained immediately hereinbelow.

When a sample of the fluid is desired to be analyzed, piston 28 is held at its most downward position and seats against orifices 36 and 38 and in this position functions to prevent flow of chemical absorption liquid from egressing out of chamber 30. As explained above, since there is a differential pressure being registered at probes 12 and 14, a fluid sample is conducted into chamber 18. At the time of analyzing the sample, valves 22 and 26 are actuated to trap a representative sample. Then at a predetermined time interval, (the time being relatively short) valve 24 is caused to close so as to isolate a portion of the sample between valve 22 and valve 24 which will be identical to the pressure of the sample within chamber 18. This isolated sample is the reference. The sequencer 52 at a predetermined time interval drives the pistons 35 and 28 in an upward direction. The rate of travel of the piston is selected so as to allow the gas sample to pass through the pores or interstices of the sintered piston without causing pressure buildup. The liquid absorption chemical is simultaneously forced out of chamber 30 by action of piston 35 into the chamber 18 formed on the underneath side of piston 28. This causes the liquid absorption chemical to come into intimate contact with the sample fluid within chamber 18. At a given time interval, the sequencing device causes the piston 28 to move downwardly, again at a rate so as not to cause pressure buildup within chamber 18. Due to the porosity of the piston, the residual sample will pass therethrough and the chemical absorption which now contains the constituent being analyzed is forced back through orifices 36 and 38. To assure that a pressure buildup will not be evidenced on the underneath side of piston 28, check valve 58 schematically illustrated may be provided to allow liquid absorbent to be vented back into chamber 30. It may be desirable to repeat this procedure one or several times depending on the degree of accuracy of gas analysis required. When the piston 28 has completed its downward stroke, the volume in chamber 18 will now contain only the residual fluid which will be at a lower pressure since the partial pressure exhibited by the removed constituent is no longer present. This pressure is then compared with the reference pressure and the differential recorded between the two pressures is a direct measure of the constituent partial pressure or molecular content. Since there is a direct correlation between the gas constituent and its partial pressure, this differential pressure is accordingly a function of the removed constituent. The sensing transducer indicated generally by numeral 56 may be of any of the well-known differential sensing devices which may be designed to either give an output signal which functions to operate an environmental control system as disclosed in the aforementioned Arnoldi application or which may operate a recording device which serves to indicate the quantity of chemical constituent contained in the sample gas.

A differential sensing device is shown in FIG. 1 as comprising an outer casing 60 and a movable diaphragm 62. The diaphragm forms two opposing chambers 64 and 66. Chamber 64 is placed in communication with the referenced pressure by line 68 and chamber 66 is placed in communication with the analyzed gas via line 70. An indicator 72 is schematically shown as receiving the differential pressure signal for visual observation.

Such a system as described is particularly suited to analyze carbon dioxide in a closed vehicle, such as an outer space vehicle, which is intended to be subjected to a zero gravity field.

Figure 2:
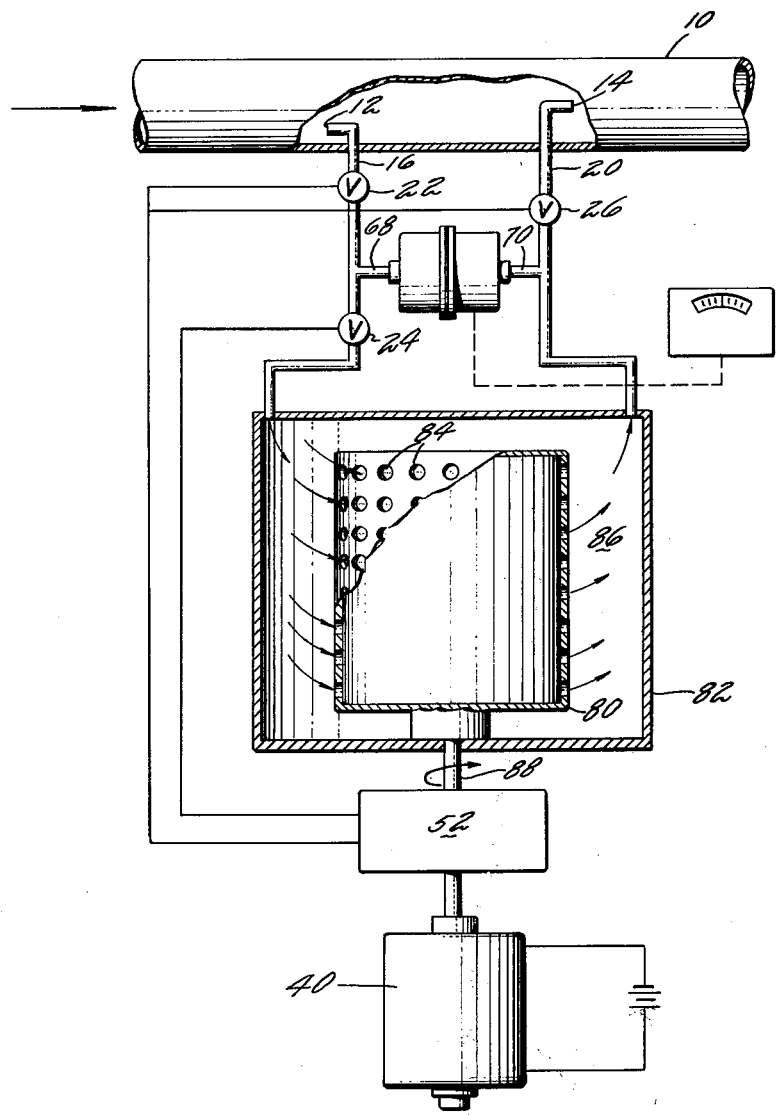
FIG. 2 is a schematic illustration showing another embodiment of our invention.

Another preferred embodiment is shown in FIG. 2, which lends itself to be adapted to use a solid chemical absorbent material in lieu of the liquid as was used in connection with FIG. 1.

For convenience, a description of the sensing mechanism and the operation thereof has been omitted since it is essentially identical to the sensing systems described in FIG. 1. The cylindrical container 80 is centrally disposed in casing 82 and contains a solid absorbent which may be of the well-known material such as potassium hydroxide. The cylinder may be of any of the well-known chemical resistant materials and includes a plurality of spaced drilled holes 84 which serve to admit the gas to be analyzed within the container. This serves to put the gas in intimate contact with the chemical absorbent material. The gas to be analyzed is induced into the chamber 86 in the manner described in connection with FIG. 1. A motor 40 drives a sequencer 52 to sequence the opening and closing of the valves in their proper order. Cylinder 80 is rotatably mounted with shaft 88 which is driven by motor 40 by way of sequencer 52. The cylinder may be continuously rotated while the sample is being analyzed. While the present drawing shows motor 40 located on the outside of casing 82, it is contemplated that the motor 40 and the sequencer 52 may be mounted inside of the casing 82. This type of mounting would eliminate the necessity of sealing the shaft protruding through the casing.

What has been shown by this invention is a simplified gas analyzer which is completely autonomous and self-contained so as to isolate a system from undesirable conditions such as dust, vibrations, etc. The system to be operable does not require the forces of gravity nor do these forces influence the operation or accuracy thereof.

It is to be understood that the invention is not limited to the specific embodiment herein illustrated and described, but may be used in other ways without departing from its spirit as defined by the following claims.

We claim:

1. A gas analyzer for measuring the quantity of a gas constituent in a moving airstream comprising a gas sampling chamber, a container having a supply of gas absorption material, means for placing said material in intimate contact with the gas sample in the gas sampling chamber, means for establishing a reference pressure equal to the value of the pressure of the gas sample within the gas sampling chamber prior to absorption, means for comparing the reduction of gas pressure resulting from absorption of the gas within the gas sampling chamber with said reference pressure, means for inducing flow of the airstream into the gas sampling chamber including a first and second passage, said first passage extending into the airstream and having its opening opposing the direction of flow of the airstream, said second passage extending into the airstream and having its opening facing the direction of flow of the airstream.

2. A gas analyzer for measuring the quantity of a gas constituent in a moving fluid stream comprising a gas sampling chamber, a container encasing a gas of absorption material, means for inducing the fluid from the fluid stream to flow into said chamber including first and second passage means, said first passage means extending into the fluid stream and having its opening opposing the direction of flow of the fluid stream, said second passage means extending into said fluid stream and having its opening facing the direction of flow of the fluid stream, means for establishing a reference pressure, means imparting the gas absorption material into said gas chamber for placing the fluid in the gas chamber into intimate contact with the gas absorption material, means for returning the gas absorbent material to the container, and means for comparing the pressure of the residual fluid with said reference pressure, the reduction of fluid resulting from the absorption of the gas constituent of the fluid in said sampling chamber.

3. A gas analyzing apparatus for sampling a gas constituent of a fluid stream, comprising a first chamber including means for admitting said fluid therein, a reciprocating sintered piston disposed in said chamber, a second chamber connected to said first chamber containing a liquid chemical absorbing material, a shaft, a second piston disposed in said second chamber and mounted on said shaft, said first piston also secured to said shaft, means for imparting rectilinear motion to said shaft, an opening between said first and second chambers for placing the absorbent material in the second chamber in intimate contact with the fluid in the first chamber, and said sintered piston functioning to return the chemical absorption liquid to the second chamber.

4. An apparatus as defined in claim 3 including a spring acting on one side of said second piston and first stop and second stop means secured to the shaft whereby said spring urges said second piston to take up the void caused by the loss of any of the absorbing material.

5. An apparatus as defined in claim 3 including means for obtaining a reference signal having a value equal to the pressure in the first chamber before the absorption material comes into intimate contact with said fluid and passage means connected to the first chamber for transmitting a pressure signal equal to the value of the pressure of the fluid after the gas constituent has been removed.

6. In a gas analyzer having a casing forming a gas sampling chamber, means for inducing a gaseous sample into said sampling chamber, a reciprocating sintered piston disposed in said chamber having a connecting stem extending axially through an opening in the wall of the casing, a chamber containing a liquid absorption material connected in line-on-line relation to said gas sampling chamber, a piston in said chamber mounted on said stem and movable therewith, the end of the stem extending through said chamber, means cooperating with the portion of the stem extended beyond said chamber for imparting reciprocal motion thereto, an opening formed in the wall of said casing communicating the fluid in the gas sampling chamber with the liquid absorption material in said chamber.

7. In combination, a device as claimed in claim 6 including means for measuring the quantity of constituent removed from the gaseous sample, said measuring means including a pressure differential indicating device, a first and second passage means connected to an inlet opening and outlet opening formed in said gas sampling chamber, a first valve disposed in said first passage and first and second spaced apart valves disposed in said second passage defining a reference pressure chamber, and a sequentially operating device for controlling the opening and closing of said valves, conduit means connecting said first passage at a point upstream of said first valve to the differential indicating means and connecting the reference pressure chamber to said differential indicating means.

8. In a gas analyzer having a gas sampling chamber, means for inducing flow of a fluid into said chamber including a first and second passage, a rotatable solid absorption agent containing member disposed in said chamber, said member having an outer casing providing openings for placing the fluid into intimate contact with the absorption agent, means for imparting rotation to said member, sequentially operated valves disposed in said passages, one of said passages containing a pair of spaced apart valve means sequentially operable for providing a reference pressure signal, means for comparing said reference signal with the reduced pressure of the fluid resulting from absorption of the gas in the gas sampling chamber for measuring the extent of gas absorption.

9. A gas analyzer for measuring a constituent of a moving fluid stream, a housing defining a gas sampling chamber including first and second passage means for conducting the flow of fluid from said fluid stream into and out of said chamber, three sequentially operated valves, two of which are disposed in spaced relation in said first passage means, and one of which is disposed in said second passage means, means for closing two of said valves, one of which is in each of said passages for isolating the gas sample from the fluid stream and means for closing said third valve for collecting a portion of said gas sample between the said two spaced apart valves to act as a reference pressure signal, a rotatable container mounted in said chamber and containing a gas absorption material, means for imparting rotation to said member, means for measuring the extent of gas absorption by comparing the pressure of the reduced gas pressure resulting from absorption with said reference pressure signal.

10. Apparatus as defined in claim 9 including a first and second passage conducting fluid intended to be analyzed to said chamber, the free end of one of said passages extending into the passage conducting the flow of the fluid stream and terminating in a pressure probe responding to the total pressure of said fluid and the free end of the other of said passages also extending into the passage conducting the flow of the fluid of the fluid stream and terminating in a pressure probe responding to the static pressure of said fluid.

11. In combination with apparatus as defined in claim 9 including a sequencing device connecting to said three valves, said device functioning to sequentially actuate said valves in a preselected time interval, so that the two of said valves, one of which is in each of said passages, are closed and then closing the third valve subsequent to the closing of the other two valves.

References Cited in the file of this patent

UNITED STATES PATENTS

| | | |
|---|---|---|
| 1,671,795 | Terhue | May 29, 1928 |
| 2,147,969 | Dowling | Feb. 21, 1939 |
| 2,449,067 | Guillemin | Sept. 14, 1948 |
| 2,940,834 | Ringrose | June 14, 1960 |